Nov. 9, 1965   D. D. STOLTMAN   3,216,447
ROAD SPEED CONTROL HEAD
Filed June 5, 1962

INVENTOR.
Donald D. Stoltman
BY
D. D. McGraw
HIS ATTORNEY

United States Patent Office 3,216,447
Patented Nov. 9, 1965

3,216,447
ROAD SPEED CONTROL HEAD
Donald D. Stoltman, Henrietta, N.Y., assignor to General Motors Corporation, Detroit, Mich., a corporation of Delaware
Filed June 5, 1962, Ser. No. 200,278
5 Claims. (Cl. 137—596.1)

The invention relates to a control head and more particularly to a control head for controlling the application of fluid pressure in a fluid pressure system, as well as the setting of a desired input parameter. The structure illustrated in the drawing may be utilized in vehicle road speed controlling systems of the types disclosed and claimed in application S.N. 115,539, entitled "Speed Control System," and filed June 7, 1961, and application S.N. 132,842, now Patent No. 3,155,188, entitled "Friction Feed-Back Speed Control," and filed August 21, 1961. Reference is therefore made to the disclosure of these applications for more detailed explanations of the operation of speed control systems of this nature.

A control head embodying the invention is applicable to other fluid pressure operated systems in which the fluid pressure in a conduit is to be interrupted with one portion of the conduit to be vented at that time, and in which under other conditions of operation the vent is to be closed and the conduit is to have fluid communication through the control head. A control head embodying the invention is particularly adapted for installation on an instrument panel or in another convenient location in a vehicle so that the operator may effectively utilize and control the system to which the control head is attached. It is desirable to have a control head which is simple and positive in operation and which provides safety features wherein the system being controlled is rendered positively inoperative when it is desired to cease operation of the system. Such a control head should also incorporate convenient and legible indicators showing the condition of operation of the system and also the information which is placed into the system such as, for example, a desired vehicle speed. A control head embodying the invention accomplishes these desirable results.

Figure 1:
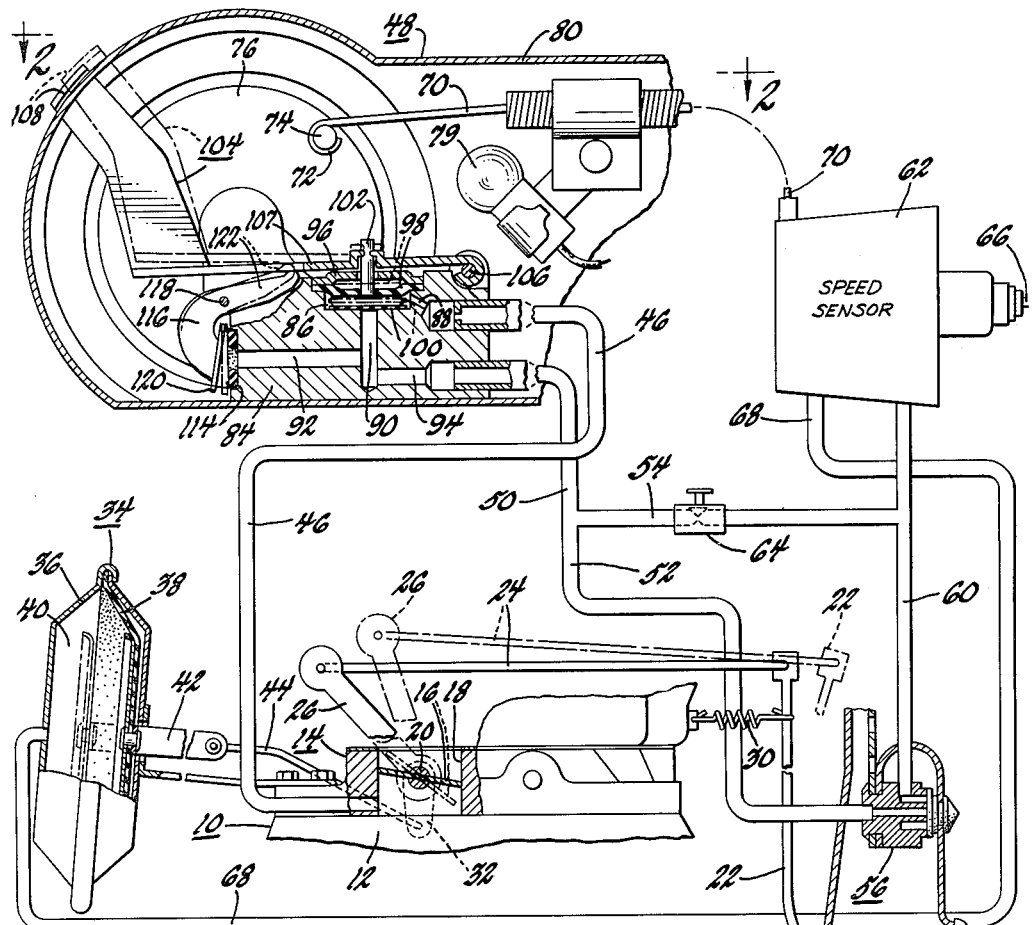
FIGURE 1 is a generally schematic representation of a system employing a control head embodying the invention, with parts broken away and in section.
Figure 2:
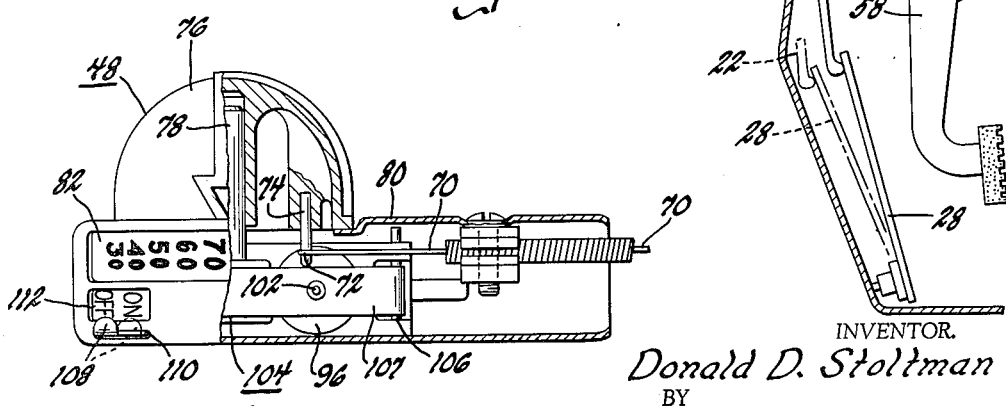
FIGURE 2 is a partial section view with parts broken away, taken in the direction of arrows 2—2 of FIGURE 1, and particularly illustrating the control head embodying the invention.

While the above noted applications provide a more specific description of the vehicle speed control system illustrated in FIGURE 1, a general description of that system is provided here, with reference being made to those applications for additional details.

The vehicle engine 10 has an intake manifold 12 to which the fuel-air mixture is provided by suitable means such as the carburetor 14. The supply of the fuel-air mixture to the engine 10 is controlled by a throttle valve 16 placed in the intake passage 18 of the carburetor, in the manner well known in the art. Valve 16 is secured to a shaft 20 so that it is rotatable to various throttle opening positions within the passage 18. A suitable throttle linkage is provided to control movement of the valve 16. This linkage includes, for example, links 22, 24 and 26 which are suitably movable by the accelerator pedal 28. A suitable throttle return spring 30 is provided to urge the throttle valve toward the zero throttle position shown in solid lines in FIGURE 1. Movement of the accelerator pedal to the dashed line position shown in that figure results in movement of the throttle linkage so that the valve 16 is moved toward the open throttle position and may occupy a position in passage 18 such as that illustrated by the dashed outline of the throttle valve. A link 32 may also be secured to throttle valve shaft 20 so as to rotate with that shaft and to provide for rotation of the shaft under influence of the servomotor 34 which forms a part of the control system. The servomotor 34 is formed to include a housing 36 in which a diaphragm 38 is provided to define, together with part of housing 36, a control chamber 40. An arm 42 is secured to the diaphragm 38 and is movable therewith. A suitable rod or other linkage 44 is attached to arm 42 and to throttle valve link 32 to control movement of the throttle valve by movement of the diaphragm 38 under certain conditions of operation.

Intake manifold pressure, which is a partial vacuum, is communicated through conduit 46 to the control head 48 and conduit 50. Conduit 50 has conduits 52 and 54 connected therewith. Conduit 52 leads to a brake pedal actuated spoiler valve assembly 56 which operates to vent the system to atmosphere when the brake pedal 58 is actuated to apply the vehicle brakes. A conduit 60 leads from the spoiler valve assembly 56 to the speed sensor mechanism 62. Conduit 54 is also connected to conduit 60 and is provided with a variable restriction 64 which is set to calibrate the system.

Speed sensor 62 may be of the general type disclosed in greater detail in the above noted applications. It senses vehicle speed through the speedometer cable 66 and provides a control pressure in the conduit 68 leading from the speed sensor mechanism to the control chamber 40 of the servomotor 34. Thus raw manifold vacuum is provided to the speed sensor through conduit 60 and a control vacuum is provided from the speed sensor mechanism to the servomotor 34.

The speed sensor mechanism 62 also receives a desired input speed signal which may be set in the manner more particularly disclosed and described in the above noted applications. This may be accomplished by movement of the cable 70 connected to the speed sensor mechanism 62 and to the control head 48. The end 72 of cable 70 is secured to an anchor pin 74 of the control head control knob 76. This knob is rotatably mounted on a shaft 78 so that rotation of the knob causes cable 70 to move a desired amount to set the desired input speed in the speed sensor mechanism 62. A suitable light source such as light bulb 79 may be provided within the housing 80 of the control head 48. A suitable translucent dial 82, marked with indications of vehicle speed, may also be placed in a part of housing 80 and a portion of control knob 76 may extent intermediate the dial 82 and the light bulb 79 and be provided with a slot so that light from the bulb 79 will light up the portion of dial 82 comparable to the desired speed thereby and indicate to the vehicle operator the speed input that he has set.

The control head 48 is also provided with a valve body or housing 84 which is suitably mounted within the control head housing 80. The housing 84 is provided with a valve chamber 86 to which is connected a passage 88 in fluid communication with the conduit 46 to provide a fluid pressure input to the valve chamber. Another passage 90 provides a fluid pressure outlet from the chamber 86 and is connected with branch passages 92 and 94. Passage 92 is a vent passage and passage 94 is connected in fluid communication with the outlet conduit 50. A valve chamber cover 96 is also provided and holds a diaphragm 98 in position to seal the valve chamber so that fluid pressure may enter and leave the chamber only through passages 88 and 90. A free floating disk valve 100 is positioned in chamber 86 and is of sufficient size to cover passage 90 without regard to lateral movement of the valve in the chamber and is sufficiently thin so as not to restrict passage 88 at any time. In order to prevent passage 88 from being closed at any time by the valve 100, the passage 88 is preferably formed in the side of the valve chamber in the manner illustrated. A plunger 102 is attached to diaphragm 98 and extends through cover 96. Plunger 102 may reciprocate and cause movement of diaphragm 98 within chamber 86. A lever 104 is pivotally attached to the valve body 84 by pivot 106 and is also secured to the outer end of plunger 102. The lever 104 is provided with a relatively straight flat section 107 which extends over cover 96 for this purpose. Lever 104 has the other end thereof bent upwardly from section 107 and terminating at 108 by extending through a suitable slot 110 in the control head housing 80 adjacent an on-off dial 112 so that the lever end 108 may be moved by the vehicle operator to either the "on" or "off" position to control the diaphragm 98 as well as the vent valve to be described.

Vent passage 92 has the outer end thereof provided with a valve seat 114. A vent valve bell crank lever 116 is pivotally attached at 118 to housing 84 and has a valve face 120 formed on the end thereof so that it may seat against seat 114 to seal vent passage 92. Lever 116 has the other end 122 extending beyond pivot 118 and engageable with the underside of the flat section 107 of lever 104. Lever end 122 of lever 116 therefore supports lever 104 when valve face 120 is seated against its seat 114. When lever section 107 moves downwardly about its pivot, as seen in FIGURE 1, it causes lever 116 to move clockwise about its pivot 118 to forcibly unseat valve 120 from seat 114 and open passage 92 to the atmosphere. This movement of lever 104 occurs when the operator moves the lever end 108 to the "off" position. Then lever 116 no longer supports lever 104. At the same time, lever 104 acts through plunger 102 against diaphragm 98 and forces valve 100 to close passage 90. Once the vent valve 120 is unseated, the lever 116 offers no support to hold lever 104 in the upward or "on" position and the weight of the lever 104 acting through plunger 102 and diaphragm 98 holds valve 100 so as to maintain passage 90 in the closed position. Valve 100 is also held in position by diaphragm 98 which is subjected to manifold vacuum in chamber 86 and to atmospheric pressure on the opposite side thereof. The control head is therefore held in the "off" position. Under this condition raw intake manifold pressure is not permitted to enter passage 90. Instead, passages 90, 92 and 94 are vented to atmospheric pressure, thereby venting servomotor control chamber 40 to atmospheric pressure through conduits 50, 54 and 60, speed sensor 62 and conduit 68.

When it is desired to energize the speed control system, the operator moves lever end 108 in its slot 110 to the "on" position. This has the effect of lifting lever 104, and particularly its section 107, so as to lift diaphragm 98 and permit valve 100 to be moved upwardly by the differential pressure in chamber 86 and passage 90. Intake manifold pressure will then be communicated to passage 90. At the same time, lever 116 pivots counterclockwise so that valve 120 approaches its seat 114. The valve 120 is engaged tightly against the seat and held there by the intake manifold pressure exerted in passage 92 from passage 90. The vent is therefore held closed. Intake manifold pressure is then impressed through passage 94 to conduits 50, 54 and 60 to the speed sensor mechanism 62. When the vehicle speed approaches the desired speed set into the speed sensor mechanism by control knob 76 and cable 70, the speed sensor mechanism operates as described in the above identified applications to effect a control pressure in conduit 68 and control chamber 40. This pressure acts on diaphragm 38 to control the throttle valve 16 through arm 42, rod 44 and link 32 to maintain the desired vehicle speed.

If the vehicle operator actuates the vehicle brake by movement of the pedal 58, the brake pedal spoiler valve will vent conduits 52 and 60 to atmosphere. This immediately vents control chamber 40 and removes the influence of servomotor 34 from throttle valve 16. This also releases vent valve 120. The intake manifold pressure acting on diaphragm 98 and the weight of lever 104 pulls lever 104 downwardly to close valve 100 against passage 90 and also pivot lever 116 clockwise to hold valve 120 away from its seat 114. The system is therefore deenergized and remains deenergized until the operator again actuates it through the control head after the brake spoiler valve has again closed by release of the brake pedal 58.

A control head for a fluid control system has therefore been provided which is simple and positive in operation and operates to maintain the system in the deenergized condition if for any reason the system operation is interrupted. It permits the system operator to energize or deenergize the system manually under his direct control. It also permits the input of a desired parameter such as vehicle speed into a part of such a control system.

I claim:

1. A control head for a fluid pressure actuated vehicle road speed control system, said control head comprising, a housing having a chamber formed therein and a fluid pressure inlet and a fluid pressure outlet and a vent connected with said chamber, inlet control valve means closing said vent while interconnecting said inlet and said outlet, and opening said vent while disconnecting said inlet and said outlet, fluid pressure responsive means actuable by inlet fluid pressure in said chamber to discontinue fluid communication between said fluid pressure inlet and said fluid pressure outlet, and to place said fluid pressure outlet in fluid communication with said vent, said control head being adapted to have said inlet and said outlet in communication with the fluid pressure actuated vehicle road speed control system to control the fluid pressure application therein.

2. In a control head, a valve assembly comprising, a housing, a valve chamber formed therein and having a chamber fluid pressure inlet and a chamber fluid pressure outlet, a housing fluid outlet and a housing fluid pressure vent in communication with said chamber fluid pressure outlet, a valve in said chamber, said chamber outlet providing a valve seat for said valve and adapted to be closed thereby, valve operating means in said chamber and a lever pivoted to said housing and operatively engaging said valve operating means and movable to seat said valve on said valve seat, said valve operating means including fluid pressure responsive means responsive to fluid pressure in said chamber seat when said valve is seated to hold said valve seated.

3. The valve assembly of claim 2, said valve in said chamber being free floating in said chamber when unseated from said valve seat.

4. The valve assembly of claim 2 further comprising, a second lever pivotally attached to said housing and having a vent control valve on one end thereof for opening and closing said housing fluid pressure vent, the other end of said second lever engaging said first named lever and operated thereby to open said housing fluid pressure vent when said chamber outlet is closed by pivotal movement of said first named lever in one direction, said vent control valve closing said housing fluid pressure vent when said first named lever is pivoted in the other direction to open said chamber outlet.

5. In a control head for a fluid system having an adjustable member and first and second differential pressures, a housing, first and second conduit means in said housing respectively connectable with said fluid system first and second differential pressures, a valve chamber formed in said housing and having said first and second conduit means connected thereto, a diaphragm forming one wall of said chamber and a valve received in said chamber for closing said first conduit means from said chamber, manual means movable to open said valve against the force of said differential pressure acting on said diaphragm, and means for holding said manual means open include a pressure sensitive valve and lever actuated thereby, said pressure sensitive valve being exposed to said first differential pressure to act through said lever and hold said chamber valve open until a predetermined pressure change in said first conduit means releases said pressure sensitive valve.

References Cited by the Examiner
UNITED STATES PATENTS

| | | | |
|---|---|---|---|
| 1,903,338 | 4/33 | Horne | 137—627.4 XR |
| 3,084,758 | 4/63 | Thorner | 123—103 XR |

WILLIAM F. O'DEA, *Primary Examiner.*